United States Patent [19]

Mennicke et al.

[11] 4,234,479
[45] Nov. 18, 1980

[54] CHROMIUM MIXED COMPLEX DYESTUFFS OF PHENYL-AZO-PYRAZOLE COMPONENTS

[75] Inventors: Winfried Mennicke, Leverkusen; Walter Scholl, Cologne; Karl-Heinz Schündehütte, Opladen, all of Fed. Rep. of Germany

[73] Assignee: Bayer Aktiengesellschaft, Leverkusen, Fed. Rep. of Germany

[21] Appl. No.: 762,480

[22] Filed: Jan. 26, 1977

Related U.S. Application Data

[63] Continuation of Ser. No. 452,929, Mar. 20, 1974, abandoned.

[30] Foreign Application Priority Data

Mar. 20, 1973 [DE] Fed. Rep. of Germany ....... 2313722

[51] Int. Cl.$^2$ ............ C09B 45/02; C09B 45/06; C09B 45/16; D06P 1/10
[52] U.S. Cl. ............ 260/145 B; 260/147
[58] Field of Search ............ 260/145 B, 147

[56] References Cited

U.S. PATENT DOCUMENTS

| | | | |
|---|---|---|---|
| 1,984,096 | 12/1934 | Staub et al. | 260/145 B |
| 2,826,572 | 3/1958 | Kuster et al. | 260/145 B |
| 2,832,760 | 4/1958 | Zickendraht et al. | 260/145 B |
| 2,937,165 | 5/1960 | Feiss | 260/145 B |
| 3,062,806 | 11/1962 | Biedermann et al. | 260/147 |
| 3,621,006 | 11/1971 | Jirou et al. | 260/145 B |
| 4,029,643 | 6/1977 | Koiso et al. | 260/145 B |

FOREIGN PATENT DOCUMENTS

| | | | |
|---|---|---|---|
| 1011546 | 7/1957 | Fed. Rep. of Germany | 260/145 B |
| 1226727 | 10/1966 | Fed. Rep. of Germany | 260/147 |
| 1254785 | 11/1967 | Fed. Rep. of Germany | 260/145 B |
| 1271857 | 7/1968 | Fed. Rep. of Germany | 260/147 |
| 40-13511 | 6/1965 | Japan | 260/147 |
| 44-21867 | 9/1969 | Japan | 260/147 |
| 303888 | 12/1954 | Switzerland | 260/147 |
| 307178 | 5/1955 | Switzerland | 260/147 |
| 331212 | 7/1958 | Switzerland | 260/145 B |
| 420431 | 3/1967 | Switzerland | 260/147 |
| 765355 | 6/1954 | United Kingdom | 260/145 A |
| 1120489 | 7/1968 | United Kingdom | 260/145 B |
| 1216576 | 12/1970 | United Kingdom | 260/147 |

*Primary Examiner*—Floyd D. Higel
*Attorney, Agent, or Firm*—Sprung, Felfe, Horn, Lynch & Kramer

[57] ABSTRACT

Unsymmetrical chromium mixed complex dyestuffs of the formula

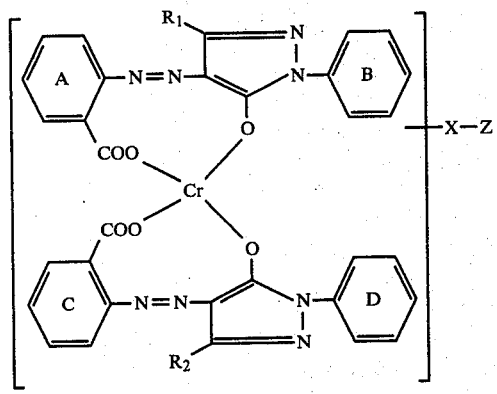

wherein $R_1$ and $R_2$ denote $C_1$–$C_4$-alkyl, nitrile, carbonamide or X-Z, X denotes a direct bond or a bridge member to a C atom of the rings A, B, C or D or to a 3-C atom of the pyrazoles and Z denotes $SO_3H$, COOH or $OSO_3H$ and A, B, C and D can possess further substituents, are suitable for the dyeing and printing of nitrogen-containing fibrous materials in yellow shades.

2 Claims, No Drawings

CHROMIUM MIXED COMPLEX DYESTUFFS OF PHENYL-AZO-PYRAZOLE COMPONENTS

This is a continuation of application Ser. No. 452,929, filed Mar. 20, 1974, now abandoned.

The invention relates to unsymmetrical chromium mixed complex dyestuffs which in the form of the free acid correspond to the formula

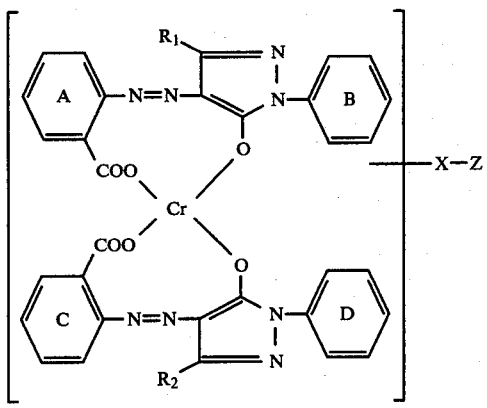

wherein
$R_1$ and $R_2$ denote $C_1$–$C_4$-alkyl, nitrile, carbonamide or X-Z,

X denotes a direct bond or a bridge member to a C atom of the rings A, B, C or D or to a 3-C atom of the pyrazoles and Z denotes $SO_3H$, COOH or $OSO_3H$ and A, B, C and D can possess further substituents, their preparation and use.

Examples of suitable bridge members X are methylene or O-alkylene, such as —O—$CH_2$—$CH_2$—. The carbonamide groups $R_1$ and $R_2$ can be substituted further, for example by $C_1$–$C_4$-alkyl or phenyl.

Examples of further substituents of the rings A, B, C and D are halogen, such as Cl or Br; alkyl, especially $C_1$–$C_4$-alkyl; alkoxy, especially $C_1$–$C_4$-alkoxy; nitro; nitrile; hydroxyl; acyl, especially alrylcarbonyl, such as benzoyl; arylazo, especially phenylazo which is optionally substituted, for example by nitro, $C_1$–$C_4$-alkyl, $C_1$–$C_4$-alkoxy or halogen; carbonamide and sulphonamide; N-$C_1$–$C_5$-alkylsulphonamide; N,N-di-$C_1$–$C_5$-alkylsulphonamide; N-arylsulphonamide, especially optionally substituted N-phenylsulphonamide; $C_1$–$C_4$-alkylsulphonyl; arylsulphonyl, especially optionally substituted phenylsulphonyl; acylamino, such as formylamino, $C_1$–$C_4$-alkylcarbonylamino, $C_1$–$C_4$-alkylsulphonylamino, arylcarbonylamino, especially optionally substituted benzoylamino and arylsulphonylamino, especially optionally substituted benzenesulphonylamino, and also reactive groups of the heterocyclic series, bonded via an amino group, such as are described in German Offenlegungsschrift (German Published Specification) No. 1,644,186.

The alkyl and alkoxy radicals can possess further substituents.

The rings B and D can be benzanellated.

Preferred dyestuffs are those of the formula

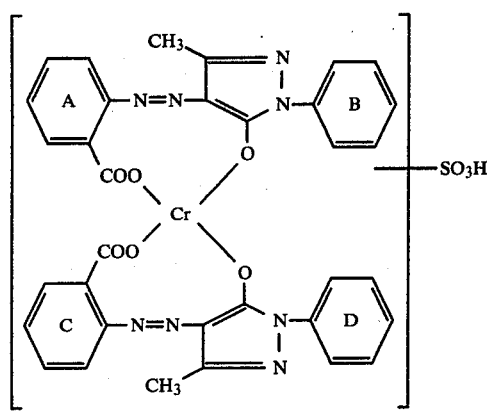

wherein
$SO_3H$ is bonded to one of the rings A, B, C or D and these rings can additionally contain the abovementioned substituents.

Particularly preferred dyestuffs are those of the formula II wherein
the rings A, B, C and D can contain nitro, halogen, such as chlorine and bromine, $C_1$–$C_4$-alkyl, $C_1$–$C_4$-alkoxy, $C_2$–$C_5$-alkylcarbonylamino, $C_2$–$C_5$-alkylcarbonyl or carboxyl as substituents and the rings B and D can be benzanellated.

The new dyestuffs can be prepared by reaction of the 1:1 chromium complex compound of an azo dyestuff of the formula III with an azo dyestuff of the formula IV

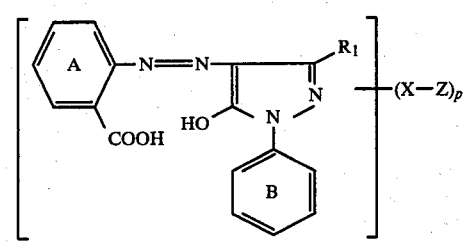

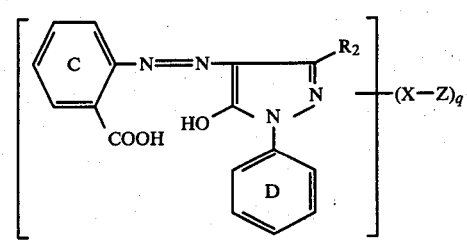

wherein
p and q=0 or 1 and
p+q=1 and
$R_1$, $R_2$, X, Z and the rings A, B, C and D have the abovementioned meaning.

Preferably, the azo dyestuff containing the acid group X-Z is converted into the corresponding 1:1 chromium complex compound and the azo dyestuff free of the acid group X-Z is caused to undergo addition to the former.

The azo dyestuffs III and IV required for the preparation of the chromium mixed complexes according to the invention can be prepared by the customary methods, for example by combining the diazonium salts of the aminocarboxylic acids V with the pyrazolone derivatives VI.

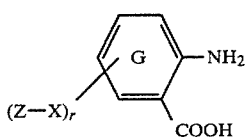

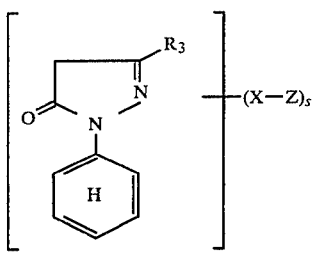

wherein
r and s=0 or 1,
r+s=0 or 1 with the proviso that the total number of (X-Z) in III and IV is 1.
G represents A or C and
H represents B or D and
$R_3$ denotes $C_1$-$C_4$-alkyl, especially methyl, CN, carbonamide or X-Z and
the group X-Z can be bonded to a C atom of rings G or H or to the 3-C atom of the pyrazolone.

Examples of suitable aminocarboxylic acids V are: 2-aminobenzoic acid, 4- or 5-nitro-2-aminobenzoic acid, 4-, 5- or 6-chloro-2-aminobenzoic acid, 4-bromo-2-aminobenzoic acid, 3,5-dichloro-2-aminobenzoic acid, 3- or 4-methyl-2-aminobenzoic acid, 3-methoxy-2-aminobenzoic acid, 4-methoxy-5-bromo-2-aminobenzoic acid, 5-acetyl-2-aminobenzoic acid, 2-aminobenzoic acid -4- or -5-sulphonic acid, 3- or 5-nitro-2-aminobenzoic acid -4-sulphonic acid, 5-chloro-2-aminobenzoic acid -3- or -4-sulphonic acid, aniline-2,3-dicarboxylic acid, aniline-2,4-dicarboxylic acid and aniline-2,5-dicarboxylic acid.

Examples of suitable pyrazole derivatives VI are: 1-phenyl-3-methyl-5-pyrazolone, 1-phenyl-3-aminocarbonyl-5-pyrazolone, 1-phenyl-3-cyano-5-pyrazolone, 1-phenyl-5-pyrazolone-3-carboxylic acid, 1-(2'-, 3'- or 4'-chlorophenyl)-3-methyl-5-pyrazolone, 1-(2'-, 3'- or 4'-bromophenyl)-3-methyl-5-pyrazolone, 1-(2'-, 3'- or 4'-methylphenyl)-3-methyl-5-pyrazolone, 1-(2'-, 3'- or 4'-methoxyphenyl)-3-methyl-5-pyrazolone, 1-(2'-, 3'- or 4'-nitrophenyl)-3-methyl-5-pyrazolone, 1-(2'-ethylphenyl)-3-methyl-5-pyrazolone, 1-(2',5'-dichlorophenyl)-3-methyl-5-pyrazolone, 1-(2',4',6'-trichlorophenyl)-3-methyl-5-pyrazolone, 1-(2',4'-dichloro-5'-methylphenyl)-3-methyl-5-pyrazolone, 1-(2'-chloro-6'-methylphenyl)-3-methyl-5-pyrazolone, 1-(2'-methoxy-5-methylphenyl)-3-methyl-5-pyrazolone, 1-(2'-methyl-4'- or -5'-chlorophenyl)-3-methyl-5-pyrazolone, 1-(2',5'-dimethoxyphenyl)-3-methyl-5-pyrazolone, 1-naphthyl-(1')-3-methyl-5-pyrazolone, 1-naphthyl-(2')-3-methyl-5-pyrazolone, 1-(2'-, 3'- or 4'-sulphophenyl)-3-methyl-5-pyrazolone, 1-(2'-, 3'- or 4'-sulphophenyl)-3-aminocarbonyl-5-pyrazolone, 1-(phenyl-2'-, -3'- or -4'-carboxylic acid)-3-methyl-5-pyrazolone, 1-(3'- or 4'-sulphomethylphenyl)-3-methyl-5-pyrazolone, 1-(2'-, 3'- or 4'-β-sulphatoethoxyphenyl)-3-methyl-5-pyrazolone, 1-(2'-chloro-4'- or 5'-sulphophenyl)-3-methyl-5-pyrazolone, 1-(2',5'-dichloro-4'-sulphophenyl)-3-methyl-5-pyrazolone, 1-(4'-methyl-5'-chloro-2'-sulphophenyl)-3-methyl-5-pyrazolone, 1-(4'-methyl-2'-sulphophenyl)-3-methyl-5-pyrazolone, 1-(4'-nitro-2'-sulphophenyl)-3-methyl-5-pyrazolone, 1-(2'-methyl-4'-sulphophenyl)-3-methyl-5-pyrazolone, 1-(2'-chloro-6'-methyl-4'-sulphophenyl)-3-methyl-5-pyrazolone, 1-(4'-, 5'-, 6'-, 7'- or 8'-sulphonaphthyl-(1'))-3-methyl-5-pyrazolone and 1-(1'-, 5'-, 6'-, 7'- or 8'-sulphonaphthyl-(2'))-3-methyl-5-pyrazolone.

The conversion of the azo dyestuffs of the general formula III or IV into the corresponding 1:1 chromium complexes can be effected, by reacting the dyestuff, in an acid medium, with at least one mol equivalent of a chromium donor in an open or closed apparatus at the boiling point of the medium or, if appropriate, at temperatures exceeding 100° C. Trivalent chromium salts, such as chromium formate, chromium acetate, chromium fluoride, chromium chloride or chromium sulphate can serve as chromium donors. The dyestuff can be chromed in an aqueous medium, optionally in the presence of an organic solvent, such as alcohol, butanol or formamide.

The addition reaction of a metal-free dyestuff with a 1:1 chromium complex to form a chromium mixed complex in which two different dyestuffs of the general formula III or IV are bonded to one another via a chromium atom can be effected by heating the two reactants in aqueous solution or suspension in the presence of an acid-binding agent.

The temperature is preferably kept at between 40° and 100° C. Examples of possible acid-binding agents are alkali metal hydroxides or alkali metal carbonates or alkali metal acetates, such as sodium hydroxide solution, sodium carbonate or sodium acetate, or the corresponding lithium, potassium or ammonium salts. The reaction can at times be accelerated by adding an organic solvent, such as alcohol or formamide, or adding a surface-active agent.

The molar ratio of the 1:1 chromium complex to the metal-free dyestuff can vary between the values 0.85:1 and 1:0.85. An excess of the 1:1 complex is in general less harmful than an excess of the metal-free dyestuff. The best results are obtainable with a molar ratio of 1:1.

The above processes give yellow 1:2 chromium mixed complexes of high brilliance which are suitable for dyeing and printing nitrogen-containing fibrous materials such as wool, silk and leather as well as polyamide or polyurethane fibres and fibre mixtures, for example, a mixture of wool and polyamide. The dyeing process is preferably carried out in a neutral to weakly acid bath, for example in a bath containing acetic acid. It can also prove advantageous to allow the pH value to decrease somewhat during the dyeing process. The pH value can be lowered by adding substances such as ammonium acetate or ammonium sulphate which undergo decomposition during the dyeing process to form a volatile base and an acid component which remains in the dye bath. Further, the customary dyeing auxiliaries, such as sodium sulphate or condensation products of ethylene oxide and amines or alcohols can be added to the dye bath.

EXAMPLE 1

0.1 mol of the 1:1 chromium complex dyestuff obtained by reaction of diazotised 2-aminobenzoic acid -5-sulphonic acid with 1-phenyl-3-methyl-5-pyrazolone and subsequent chroming, and 0.1 mol of the dyestuff prepared from diazotised 2-aminobenzoic acid and 1-phenyl-3-methyl-3-methyl-5-pyrazolone, are stirred together in 1 liter of water. The resulting suspension is neutralised by adding dilute sodium hydroxide solution and is then warmed to 70°–80° C. After a short time, a clear yellow solution forms, which is stirred further, in the neutral pH range, at 70°–80° C., until the two dyestuffs employing as starting compounds have disappeared. Sodium chloride is added to the reaction solution and the chromium mixed complex which has precipitated and which, in the form of its free acid, corresponds to the formula

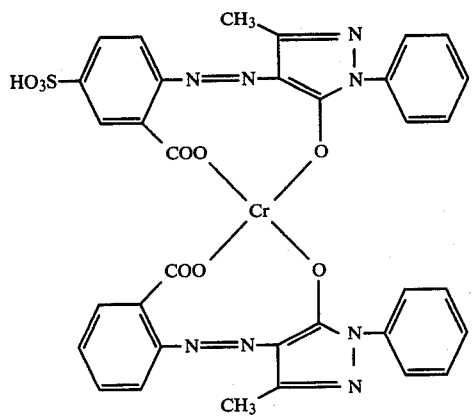

is filtered off and dried. On dyeing wool or polyamide from a weakly acid bath, a yellow dyeing of good fastness to light and good wet fastness properties is obtained.

EXAMPLE 2

0.11 mol of the dyestuff prepared from diazotised 2-aminobenzoic acid -4-sulphonic acid and 1-phenyl-3-methyl-5-pyrazolone and containing one chromium atom, bonded as a complex, per molecule, and 0.10 mol of the dyestuff prepared from diazotised 2-aminobenzoic acid and -(3′-chlorophenyl)-3-methyl-5-pyrazolone, are suspended in one liter of water. After adding 2 N sodium hydroxide solution until the pH value is 7, the mixture is warmed to 70° C. The yellow, clear solution produced after some time is stirred in the neutral range at 70° C. until no further metal-free dyestuff is detectable. On adding sodium chloride, the chromium mixed complex of the formula

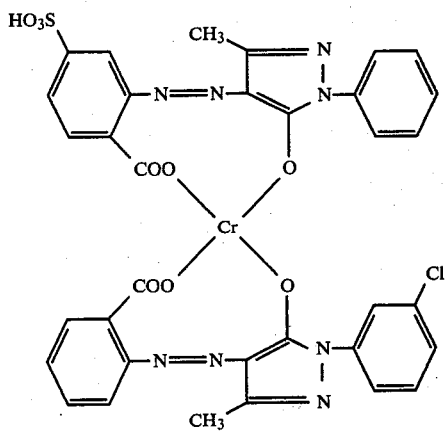

precipitates. After filtration and drying, a yellow powder is obtained, which gives brilliant yellow dyeings, of good fastness to light and good wet fastness properties, on wool and polyamide.

Unsymmetrical chromium mixed complexes with similar properties, which dye wool and polyamide fibres in clear yellow colour shades, are obtained analogously, using the azo dyestuffs I and II listed in the table which follows.

TABLE

| No. | Azo dyestuff I | Azo dyestuff II |
|---|---|---|
| 3 | (HO₃S-substituted phenyl-N=N-pyrazolone with CH₃, COOH, HO, N-phenyl) | (O₂N-substituted phenyl-N=N-pyrazolone with CH₃, COOH, HO, N-phenyl) |
| 4 | " | (Cl-substituted phenyl-N=N-pyrazolone with CH₃, COOH, HO, N-phenyl) |

TABLE-continued

| No. | Azo dyestuff I | Azo dyestuff II |
|---|---|---|
| 5 | " | 4-acetamido-2-carboxyphenylazo coupled to 3-methyl-1-phenyl-5-hydroxypyrazole |
| 6 | " | 2-carboxyphenylazo coupled to 3-carbamoyl-1-phenyl-5-hydroxypyrazole |
| 7 | " | 2-carboxyphenylazo coupled to 3-(phenylcarbamoyl)-1-phenyl-5-hydroxypyrazole |
| 8 | " | 2-carboxyphenylazo coupled to 3-methyl-1-(2-chlorophenyl)-5-hydroxypyrazole |
| 9 | " | 2-carboxyphenylazo coupled to 3-methyl-1-(3-chlorophenyl)-5-hydroxypyrazole |
| 10 | " | 2-carboxyphenylazo coupled to 3-methyl-1-(2,5-dichlorophenyl)-5-hydroxypyrazole |
| 11 | " | 2-carboxyphenylazo coupled to 3-methyl-1-(2-chloro-6-methylphenyl)-5-hydroxypyrazole |

TABLE-continued

| No. | Azo dyestuff I | Azo dyestuff II |
|---|---|---|
| 12 | " | 2-[(3-methyl-5-hydroxy-1-(3-sulfamoylphenyl)-pyrazol-4-yl)azo]benzoic acid structure |
| 13 | " | 2-[(3-methyl-5-hydroxy-1-(2-ethylphenyl)-pyrazol-4-yl)azo]benzoic acid structure (C₂H₆ shown) |
| 14 | " | 2-[(3-methyl-5-hydroxy-1-(4-nitrophenyl)-pyrazol-4-yl)azo]benzoic acid structure |
| 15 | 2-carboxy-5-sulfo-phenylazo-(3-methyl-5-hydroxy-1-phenyl-pyrazol-4-yl) structure | 2-[(3-methyl-5-hydroxy-1-(2-methoxy-5-methylphenyl)-pyrazol-4-yl)azo]benzoic acid structure |
| 16 | " | 2-[(3-methyl-5-hydroxy-1-(4-methoxyphenyl)-pyrazol-4-yl)azo]benzoic acid structure |
| 17 | " | 2-[(3-methyl-5-hydroxy-1-(2-chlorophenyl)-pyrazol-4-yl)azo]benzoic acid structure |

| No. | Azo dyestuff I | Azo dyestuff II |
|---|---|---|
| 18 | " | 2-carboxyphenyl-azo-(3-methyl-5-hydroxy-1-(2,5-dichlorophenyl)-pyrazole) |
| 19 | " | 2-carboxyphenyl-azo-(3-methyl-5-hydroxy-1-(3,4-dichlorophenyl)-pyrazole) |
| 20 | " | 2-carboxy-4-nitrophenyl-azo-(3-methyl-5-hydroxy-1-phenyl-pyrazole) |
| 21 | 2-carboxyphenyl-azo-(3-carboxy-5-hydroxy-1-phenyl-pyrazole) | 2-carboxyphenyl-azo-(3-methyl-5-hydroxy-1-phenyl-pyrazole) |
| 22 | 2,4-dicarboxyphenyl-azo-(3-methyl-5-hydroxy-1-phenyl-pyrazole) | " |
| 23 | 2,3-dicarboxyphenyl-azo-(3-methyl-5-hydroxy-1-phenyl-pyrazole) | " |

TABLE-continued

| No. | Azo dyestuff I | Azo dyestuff II |
|-----|----------------|-----------------|
| 24  | (structure)    | "               |
| 25  | (structure)    | "               |
| 26  | (structure)    | "               |
| 27  | (structure)    | "               |
| 28  | (structure)    | "               |
| 29  | (structure)    | "               |

TABLE-continued

| No. | Azo dyestuff I | Azo dyestuff II |
|-----|----------------|-----------------|
| 30 | 2-(2-carboxyphenylazo)-3-methyl-1-(3-sulfophenyl)-5-hydroxypyrazole | 2-(2-carboxyphenylazo)-3-methyl-1-(2-chlorophenyl)-5-hydroxypyrazole |
| 31 | " | 2-(2-carboxyphenylazo)-3-methyl-1-(2,5-dichlorophenyl)-5-hydroxypyrazole |
| 32 | " | 2-(2-carboxyphenylazo)-3-methyl-1-(4-nitrophenyl)-5-hydroxypyrazole |
| 33 | 2-(2-carboxyphenylazo)-3-methyl-1-(4-sulfophenyl)-5-hydroxypyrazole | 2-(2-carboxyphenylazo)-3-methyl-1-phenyl-5-hydroxypyrazole |
| 34 | 2-(2-carboxyphenylazo)-3-methyl-1-(2-carboxyphenyl)-5-hydroxypyrazole | " |
| 35 | 2-(2-carboxyphenylazo)-3-methyl-1-(3-carboxyphenyl)-5-hydroxypyrazole | " |

TABLE-continued

| No. | Azo dyestuff I | Azo dyestuff II |
|---|---|---|
| 36 | [structure: 2-carboxyphenyl-azo-(3-methyl-5-hydroxy-1-(4-carboxyphenyl)pyrazole)] | " |
| 37 | [structure: 2-carboxyphenyl-azo-(3-methyl-5-hydroxy-1-(3-CH₂SO₃H-phenyl)pyrazole)] | " |
| 38 | [structure: 2-carboxyphenyl-azo-(3-methyl-5-hydroxy-1-(4-CH₂SO₃H-phenyl)pyrazole)] | " |
| 39 | [structure: 2-carboxyphenyl-azo-(3-methyl-5-hydroxy-1-(2-O-CH₂-CH₂-O-SO₃H-phenyl)pyrazole)] | " |
| 40 | [structure: 2-carboxyphenyl-azo-(3-methyl-5-hydroxy-1-(3-O-CH₂-CH₂-O-SO₃H-phenyl)pyrazole)] | " |
| 41 | [structure: 2-carboxyphenyl-azo-(3-methyl-5-hydroxy-1-(4-O-CH₂-CH₂-O-SO₃H-phenyl)pyrazole)] | |

| No. | Azo dyestuff I | Azo dyestuff II |
|---|---|---|
| 42 | (structure: 2-carboxyphenyl-azo-pyrazolone with N-(2-chloro-5-sulfophenyl), 3-methyl, 5-hydroxy) | " |
| 43 | (structure: 2-carboxyphenyl-azo-pyrazolone with N-(2-chloro-4-sulfophenyl), 3-methyl, 5-hydroxy) | " |
| 44 | (structure: 2-carboxyphenyl-azo-pyrazolone with N-(2-chloro-6-methyl-4-sulfophenyl), 3-methyl, 5-hydroxy) | " |
| 45 | (structure: 2-carboxyphenyl-azo-pyrazolone with N-(2-methyl-4-sulfophenyl), 3-methyl, 5-hydroxy) | " |
| 46 | (structure: 2-carboxyphenyl-azo-pyrazolone with N-(2-sulfo-4-nitrophenyl), 3-methyl, 5-hydroxy) | " |
| 47 | (structure: 2-carboxyphenyl-azo-pyrazolone with N-(2-sulfo-4-chlorophenyl), 3-methyl, 5-hydroxy) | " |

TABLE-continued

| No. | Azo dyestuff I | Azo dyestuff II |
|---|---|---|
| 48 | *(structure: phenyl-N=N-pyrazolone with CH₃, HO, COOH, and N-(2,5-dichloro-4-sulfophenyl) substituent)* | " |
| 49 | *(structure: phenyl-N=N-pyrazolone with CH₃, HO, COOH, and N-(4-chloro-5-methyl-2-sulfophenyl) substituent)* | " |
| 50 | *(structure: phenyl-N=N-pyrazolone with CH₃, HO, COOH, and N-(naphthyl-SO₃H) substituent)* | " |
| 51 | *(structure: phenyl-N=N-pyrazolone with CH₃, HO, COOH, and N-(naphthyl-SO₃H, different isomer) substituent)* | " |

EXAMPLE 52

1 g of the chromium mixed complex described under Example 1 is dissolved in 2,000 ml of water. 40 ml of 30% strength acetic acid and a dispersing agent consisting of a long-chain oxethylated amine are added to the solution. The dyebath is warmed to 30°–40° C., 100 g of previously moistened wool are introduced, the whole is heated to 100° C. over the course of 30 minutes and kept at the boil for 45 minutes, and the wool is rinsed with lukewarm water. The resulting brilliant yellow dyeing shows good fastness to light and to wet processing.

EXAMPLE 53

To dye a hank of polyamide, 0.1 g of the dyestuff obtained in Example 1 is dissolved in 200 ml of water. 3 ml of a 10% strength aqueous ammonium phosphate solution and 4 ml of 3% strength acetic acid are added and 10 g of the moistened material which is to be dyed are introduced. The dyebath is heated uniformly to the boil over the course of 30 minutes and is kept at the boil for 45 minutes. It is cooled, the hank is rinsed with lukewarm water, and a clear yellow polyamide dyeing having good fastness properties is obtained.

EXAMPLE 54

10 g of the chromium mixed complex mentioned in Example 2 are dissolved in 100 ml of water with the aid of as small an amount of solvent as possible. 4 g of ammonium sulphate are added and the solution is converted into a dyestuff paste with 180 g of a paste-forming agent. Wool is printed with this dyestuff paste and is steamed at 100°–105° C. to fix the dyestuff. After washing with water, a brilliant yellow dyeing of good fastness to light and good wet fastness properties is obtained.

We claim:

1. Unsymmetrical chromium mixed complex dyestuff which in the form of the free acid has the formula

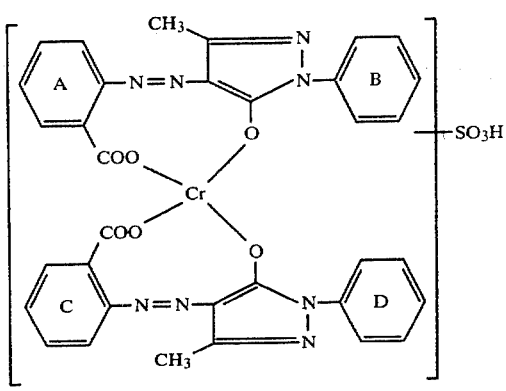

wherein
SO₃H is bonded to one of the rings A, B, C or D; the rings A and C are phenyl or phenyl substituted by nitro, halogen, $C_1$-$C_4$-alkyl, $C_1$-$C_4$-alkoxy, $C_2$-$C_5$-alkyl-carbonylamino, $C_2$-$C_5$-alkylcarbonyl or carboxyl; and the rings B and D are phenyl; phenyl substituted by nitro, halogen, $C_1$-$C_4$-alkyl, $C_1$-$C_4$-alkoxy, $C_2$-$C_5$-alkylcarbonylamino, $C_2$-$C_5$-alkylcarbonyl or carboxyl; or naphthyl.

2. The unsymmetrical chromium mixed complex dyestuff of claim 1 in which the rings A, B, C and D are phenyl or phenyl substituted by nitro, halogen, $C_1$-$C_4$-alkyl, $C_1$-$C_4$-alkoxy, $C_2$-$C_5$-alkylcarbonylamino, $C_2$-$C_5$-alkylcarbonyl or carboxyl.

* * * * *